Sept. 28, 1954          G. P. MARCO          2,690,533
CONTROL SYSTEM FOR INDUSTRIAL TRUCKS
Filed Jan. 8, 1951
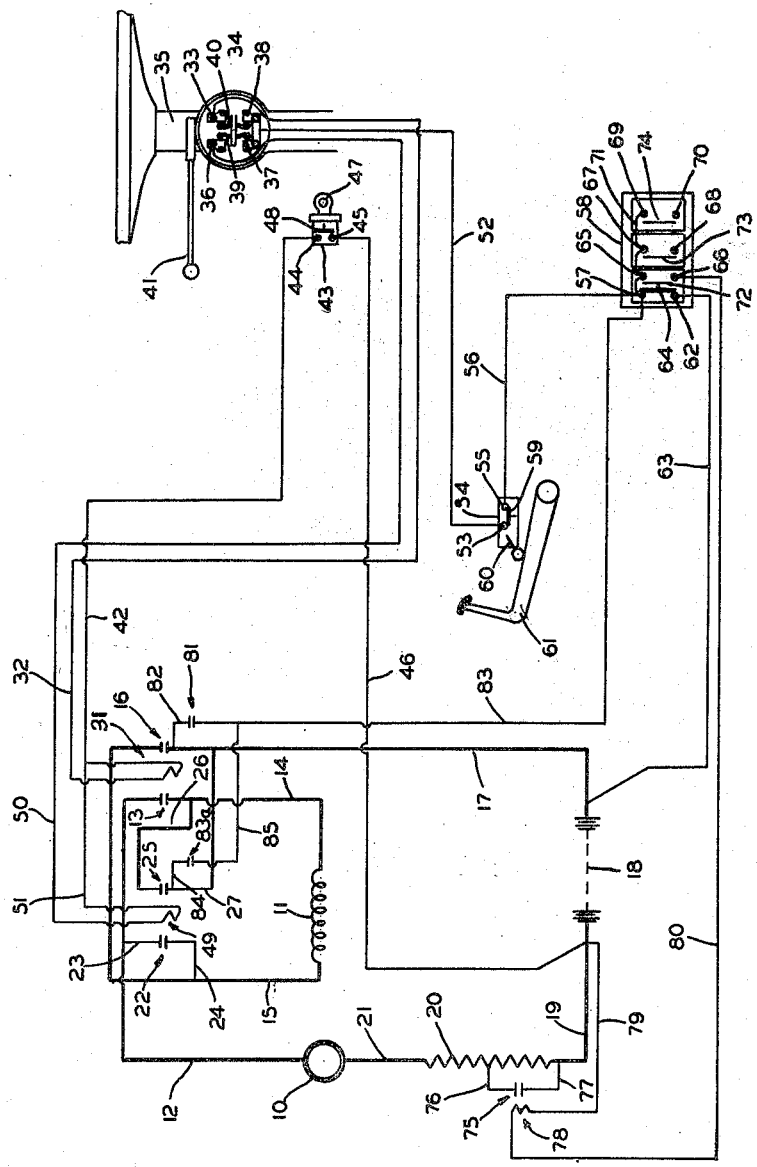
*INVENTOR.*
GEORGE P. MARCO
BY *Brown, Jackson,*
*Boettcher & Dienner*
ATTYS.

Patented Sept. 28, 1954

2,690,533

UNITED STATES PATENT OFFICE 2,690,533

CONTROL SYSTEM FOR INDUSTRIAL TRUCKS

George P. Marco, Battle Creek, Mich., assignor to Clark Equipment Company, Buchanan, Mich., a corporation of Michigan Application January 8, 1951, Serial No. 204,986

2 Claims. (Cl. 318—259)

My invention relates generally to a control system for an industrial truck, and, more specifically, is directed to an electrical control system for the electric traction motor of an industrial truck.

It is an object of my present invention to provide a control system for the electric traction motor of an industrial truck which will permit first point of power and direction of drive of the traction motor to be selected simultaneously through the manual actuation of a single control lever, preferably mounted on the steering column of the industrial truck.

It is another object of my present invention to provide a control system of the character noted, whereby the traction motor is adapted to be deenergized when the brakes of the truck are applied.

By virtue of the preceding two objects, the operator of the industrial truck, when maneuvering the latter to engage or deposit a load, need only dispose the control lever appropriately in either a forward or reverse drive position which simultaneously selects first point of power. The operator may then "inch" the truck forwardly or rearwardly by "riding" the brake pedal. That is, when the brake pedal is depressed, applying the brakes, the traction motor is deenergized, and, when the brake pedal is released, the traction motor is again energized. Thus, power may be selectively delivered intermittently to the traction wheels of the industrial truck. Operatively connecting the traction motor with the brake pedal permits the operator to maintain both his hands on the hand steering wheel for maneuvering the truck, thus affording greater safety than has heretofore been possible. By permitting first point of power and direction of drive to be effected simultaneously through the actuation of a single control lever, the number of motions required of an operator, and the resultant time consumed in maneuvering a truck while engaging and depositing a load, are materially reduced.

It is a further object of my present invention to provide a control system for an industrial truck which will permit the latter to be started only in first point of power.

I propose to accomplish the aforementioned object by providing first manually operable means for successively decreasing the total resistance of the electric motor circuit, second manually operable means for opening and closing the motor circuit, and third or interlock means for maintaining the circuit open when the second means is initially closed and the total resistance of the circuit is less than the maximum. The third means, in addition, is adapted to maintain the circuit closed as the total resistance of the circuit is decreased from an initial maximum, while the second means is maintained closed. In other words, when the circuit resistance is at a maximum and the second means is closed, the third means is simultaneously closed and the motor is driven in first point of power. Subsequently, the total resistance may be reduced without effecting the third means as long as the second means is maintained closed. However, should the second means now be opened, the third means would open simultaneously and the latter wouldd not again close even though the second means was closed unless the total resistance of the circuit was returned to a maximum. Thus the truck may be started only in first point of power.

Now in order to acquaint those skilled in the art with the manner of constructing and using the device of my present invention, I shall describe in connection with the accompanying drawing, a preferred embodiment of my present invention.

In the drawing:

The single figure is a schematic diagram of the electrical control circuit of my present invention.

Referring now to the drawing, there is shown diagrammatically a conventional electric traction motor comprising an armature 10 and a field winding or coil 11. The traction motor is adapted to be suitably incorporated in an industrial truck or other like self-propelled vehicle for powering the drive wheels or other drive elements, such as endless tracks.

In accordance with the principles of my invention, the motor is embodied in a circuit arrangement which includes a cable or line 12 providing for connection of one side of the armature 10 to one side of a first normally open contactor 13. The other side of the contactor 13 has connection through a cable or line 14 to one side of the motor field 11, which, at its other side, has connection through a cable or line 15 to one side of a second normally open contactor 16. The other side of the contactor 16 in turn, has connection through a cable or line 17 to the positive terminal of a battery 18, adapted to be carried by the vehicle in which the motor is mounted. The negative terminal of the battery 18 is connected through a cable or line 19 to one side of a resistor 20, which, at its other side, has connection through a cable or line 21 to the other side of the motor armature 10.

One side of a third normally open contactor 22 has connection through a cable or line 23 to the cable 12, and the other side of the contactor 22 has connection through a cable or line 24 to the cable 15. One side of a fourth normally open contactor 25 has connection through a cable or line 26 to the cable 14, and the other side of the contactor 25 has connection through a cable or line 27 to the cable 17.

When the contactors 13 and 16 are closed, in a manner to be hereinafter described, current flows through the motor field 11 in one direction and the electric traction motor is driven in a forward direction. When the contactors 13 and 16 are opened and the contactors 22 and 25 are closed, under certain conditions of operation discussed below, current flows through the motor field 11 in the opposite direction and the electric traction motor is driven in a reverse direction.

Preferably, actuation of the contactors 13 and 16 to closed positions is adapted to be effected by energization of a coil 31. One side of coil 31 is connected through a line 32 to the contact 33 of a forward-reverse switch 34 mounted on the steering column 35 of the industrial truck and which is adapted to be manually operated by the driver of the vehicle. The forward-reverse switch 34 further comprises contacts 36, 37 and 38, and a pair of switch blades 39 and 40. Movement of the switch blades 39 and 40 is effected by rotation of a shift or selector lever 41 operatively connected to the switch blades 39 and 40 in a conventional manner. The other side of the coil 31 has connection through a line 42 to the contact 44 of a key ignition switch 43. The contact 45 of the key ignition switch 43 has connection through a line 46 to the negative side of the battery 18. Rotation of the key 47 within the key switch 43 causes the switch blade 48 to be disposed in engagement with the contacts 44 and 45.

Actuation of the contactors 22 and 25 to closed positions is adapted to be effected by energization of a coil 49 which at its one side has connection through a line 50 to the contact 36 of the forward-reverse switch 34. The other side of the coil 49, has connection through a line 51 to the aforementioned line 42 which has connection with the contact 44 of the key switch 43.

The contacts 37 and 38 of the forward-reverse switch 34 have connection through a common line 52 to the contact 53 of a switch 54. The contact 55 of the switch 54 has connection through a line 56 to the contact 57 of a foot or hand operated master switch 58. The switch 54 has a switch blade 59 which is adapted to be moved into and out of engagement with the contacts 53 and 55 by means of a switch lever 60 operatively connected to the brake pedal 61 of the industrial truck. The switch 54 is normally closed. However, when the brake pedal 61 is depressed for applying the brakes, the switch blade 59 is retracted from engagement with the contacts 53 and 55, thereby opening the switch 54.

The contact 62 of the master switch 58 has connection through a line 63 to the positive side of the battery 18. The master switch 58 is provided with a switch blade 64 which is adapted to be moved manually by foot or hand in to and out of engagement with the contacts 57 and 62.

The master switch 58 further comprises a plurality of contacts 65, 66, 67, 68, 69 and 70. The contacts 57, 65, 67 and 69 are inter-connected by a common line 71. The master switch 58 is further provided with a switch blade 72 which is adapted to bridge contacts 65 and 66, a switch blade 73 which is adapted to bridge contacts 67 and 68, and a switch blade 74 which is adapted to bridge contacts 69 and 70.

The resistor 20 which is wired in series with the motor armature 10 is provided for reducing the current flow through the motor armature 10 so as to thereby effect first point of power at slow speed to the traction motor. In order to effect succeeding points of power, or increasing speeds of the traction motor, increasing portions of the resistor 20 may be shunted in any known and conventional manner for decreasing the effective resistance in the motor circuit. Various circuit arrangements and structures are known for effecting acceleration of electric motor driven vehicles and may be used with my present invention. On the example shown, a normally open contactor 75 is connected through a line 76 to the center tap of the resistor 20 and the contactor 75 at its other end is connected through a line 77 to the cable 19 which has connection with the negative side of the battery 18. Thus, when the contactor 75 is closed substantially one-half of the resistor 20 is shunted, which reduces the resistance in the motor circuit. Current flow through the armature 10 increases, thereby increasing the motive force of the traction motor. Actuation of the contactor 75 to closed position is effected by energization of a coil 78 which has connection at one side through a line 79 to the negative side of the battery 18. The coil 78 at its other side has connection through a line 80 to the contact 66 of the master switch 58.

Since my invention does not relate per se to such shunt means, and for the sake of clarity, only one contactor 75 is shown for shunting one-half of the resistor 20. In the light of the above description it will be observed that I have provided a motor control providing a plurality of points of power which in the embodiment of my invention herein disclosed are two in number. However, it will be readily understood that various other known shunting arrangements may be employed to provide any desired number of points of power. The number of points of power is largely dictated by the size and use of the particular vehicle in which my invention may be embodied, and when utilized in a vehicle in which more than two points of power are necessary or desired, it will be readily clear to those skilled in the art, that known expedients therefor may be resorted to.

From the foregoing description it will be realized that if only two points of power are to be utilized, contacts 68 and 70 will not have connection in the electric control system. However, if more than two points of power are required, the contacts 68 and 70 may be suitably connected to known shunting arrangements. Of course, additional contacts may be provided for the master switch in the event that more than four points of power are required.

Associated with and actuated by the coil 31 is an auxiliary normally open contactor or interlock 81 which at one side is connected through a line 82 to the cable 17 and at its other side is connected through a line 83 to the contact 57 of the master switch 58. Associated with and actuated by the coil 49 is a second auxiliary normally open contactor or interlock 83a which is connected at one side through a line 84 to the cable 27, and at its other side is connected through a line 85 to the line 83. The purpose for and the operation of the auxiliary contactors 81 and 83a will be explained more fully in detail hereinafter.

The following is a description of the operation of the control system of my present invention.

With the switch blade 64 of master switch 58 disposed in engagement with contacts 57 and 62, the switch blade 59 of key switch 54 disposed in engagement with contacts 53 and 55, and the switch blade 48 of the key switch 43 disposed in engagement with contacts 44 and 45, the traction motor is driven forwardly in first point of power when the selector lever 41 is shifted to a forward drive position disposing the switch blade 40 into engagement with contacts 33 and 38. Immediately upon effecting this shift of the selector lever 41, current flows from the positive side of the battery 18 through line 63, switch blade 64, line 56, switch blade 59, line 52, switch blade 40, line 32, coil 31, line 42, switch blade 48 and line 46, to the negative side of the battery 18. The coil 31 is thus energized and the contactors 13 and 16 and the auxiliary contactor 81 are closed. Current then flows from the positive side of the battery 18 through cable 17, contactor 16, cable 15, motor field 11, cable 14, contactor 13, cable 12, armature 10, cable 21, resistor 20, and cable 19, to the negative side of the battery 18, thus effecting drive of the traction motor. Simultaneously, current flows from the positive side of the battery 18, through cable 17, line 82, auxiliary contactor 81, and line 83, to the contact 57 of the master switch 58. Thus current is supplied to the contact 57 of the master switch 58 through two separate paths.

While the traction motor is in first point of power or slow speed, the industrial truck may be "inched" forwardly to engage a load by intermittently depressing the brake pedal 61 which, through switch lever 60, intermittently opens the brake switch 54, thus intermittently interrupting the flow of current through the traction motor. It will also be noted that if an instant stop is required, the operator of the industrial truck need only depress the brake pedal 61 which simultaneously applies the brakes of the truck and opens the electrical circuit of the traction motor interrupting the drive of the latter.

When it is desired to drive in a higher speed, or in second point of power, the master switch is actuated effecting disengagement of the switch lever 64 with the contacts 57 and 62, and simultaneously disposing the switch blade 72 into contact with contacts 65 and 66.

When the switch blade 64 is moved out of engagement with contacts 57 and 62, it will be noted that the contact 57 is no longer connected to the positive side of the battery 18 through the line 63. However, current from the positive side of battery 18 still flows to the contact 57 through cable 17, line 82, auxiliary contactor 81, and line 83.

With the switch blade 72 in contact with the contacts 65 and 66, current flows from the positive side of the battery 18 through cable 17, line 82, auxiliary contactor 81, line 83, line 71, switch blade 72, line 80, coil 78, and line 79, to the negative side of the battery 18. The coil 78 is thus energized and the contactor 75 is closed. Current in the traction motor circuit then flows through only one half of the resistor 20 and thence is shunted through line 76, contactor 75, and line 77, by-passing the other half of the resistor 20, thereby reducing the effective resistance in the traction motor circuit and increasing the motive force of the traction motor.

In trucks embodying the control system of my present invention, wherein more than two points of power are required, the contacts 68 and 70 of the master switch 58 may be suitably connected to known shunting arrangements. Then, third point of power, or third speed, and fourth point of power, or fourth speed, in a forward direction, may be effected by selectively actuating the master switch 58 so as to remove switch blade 72 from contact with contacts 65 and 66 and disposing either switch blade 73 in contact with contacts 67 and 68, or switch blade 74 into contact with contacts 69 and 70.

If reverse drive is desired, the master which is actuated so that the switch blade 64 is again disposed in engagement with the contacts 57 and 62. The selector lever 41 is then rotated so that the switch blade 40 is removed from contact with contacts 33 and 38 and the switch blade 39 is disposed in engagement with contacts 36 and 37. Current then flows from the positive side of battery 18 through line 63, switch blade 64, line 56, switch blade 59, line 52, switch blade 39, line 50, coil 49, line 51, line 42, switch blade 48, and line 46 to the negative side of the battery 18. The coil 49 is thus energized and the contactors 22 and 25 and the auxiliary contactor 83a are closed. Current then flows from the positive side of the battery 18 through the cable 17, cable 27, contactor 25, cable 26, cable 14, motor field 11, cable 15, cable 24, contactor 22, cable 23, cable 12, armature 10, cable 21, resistor 20, and cable 19, to the negative side of the battery 18 for effecting reverse drive to the traction motor. Simultaneously, current flows from the positive side of the battery 18, through cable 17, cable 27, line 84, auxiliary contactor 83a, line 85, and line 83, to the contact 57 of the master switch 58. Thus current is supplied to the contact 57 of the master switch 58 through two separate paths.

If second point of power or second speed in a reverse direction should be desired, the master switch 58 is actuated so that the switch blade 64 is withdrawn from engagement with contacts 57 and 62, and the switch blade 72 is disposed in engagement with contacts 65 and 66. It will thus be noted that the path of current flow from the positive side of battery 18 to the contact 57, through the switch blade 64 and line 63, is broken, but current is still supplied from the positive side of battery 18 to the contact 57 through the cable 17, cable 27, line 84, auxiliary contactor 83a, line 85, and line 83.

With the switch blade 72 in contact with contacts 65 and 66, current flows from the positive side of the battery 18 through cable 17, cable 27, line 84, auxiliary contactor 83a, line 85, line 83, line 71, switch blade 72, line 80, coil 78, and line 79, to the negative side of battery 18. The coil 78 is thus energized, closing the contactor 75, which as aforedescribed, provides a shunt across one half of the resistor 20 in the motor armature circuit. The total effective resistance in the motor circuit is thus reduced and the motive force of the traction motor is increased.

In trucks embodying the control system of my present invention, wherein more than two points of power are required, the contacts 68 and 70 of the master switch 58 may be suitably connected to known shunting arrangements.

Then, third point of power, or third speed, and fourth point of power, or fourth speed, in a reverse direction, may be effected by selectively actuating the master switch 58 so as to remove switch blade 72 from contact with contacts 65 and 66 and disposing either switch blade 73 in contact with contacts 67 and 68, or switch blade 74 into contact with contacts 69 and 70.

In order for the industrial truck to be shifted from forward drive to reverse drive, or from reverse drive to forward drive, the master switch must be disposed in the first point of power position. It will also be noted that the industrial truck can be started only in first point of power.

As has been described above, with the selector lever 41 in a forward drive position and the switch blade 64 of the master switch 58 in contact with contacts 57 and 62, two paths of current are provided between the positive side of battery 18 and the contact 57. That is, since the coil 31 is energized, the contactors 15 and 16 and the auxiliary contactor 81 are closed, and thus current may flow to the contact 57 of the master switch 58 from the positive side of battery 18, either through the line 63 and switch blade 64, or through the cable 17, line 82, auxiliary contactor 81, and line 83. Thus, after the truck has been initially started, the switch blade 64 may be opened without interrupting current flow to the traction motor, since although one current path between the battery 18 and contact 57 is opened, current will still flow through cable 17, line 82, auxiliary contactor 81 and line 83 to the contact 57.

However, if the brake should be depressed, opening the brake switch 54, or the selector lever 41 moved to a neutral position, or the key switch 43 opened, current flow through the coil 31 would be interrupted and the contactors 15 and 16, and the auxiliary contactor 81 would be opened, interrupting current flow to the traction motor. Now, if the switch blade 64 remains open, no current will flow to the contact 57, although the forward-reverse selector lever 41 is placed in either a forward or reverse drive position, the key switch 43 is closed, and the brake switch 54 is closed, since both current paths leading to contact 57 would remain open. The switch blade 64 must be again disposed in contact with contacts 57 and 62 before drive can again be effected to the traction motor.

In a like manner, when the selector lever 41 is disposed in a reverse drive position, and the switch blade 64 of the master switch 58 is in contact with contacts 57 and 62, two paths of current between the positive side of battery 18 and contact 57 are provided. That is, current flows from the positive side of battery 18 through the line 63 and switch blade 64, to contact 57. The coil 49 is energized, closing contactors 22 and 25 and auxiliary contactor 83a. Current then also flows from the positive side of battery 18 through cable 17, cable 27, line 84, auxiliary contactor 83a, line 85, line 83 to the contact 57. The switch blade 64 may then be opened, and although the path of current between contact 57 and the positive side of the battery 18 through line 63, is opened, the other path of current from the positive side of battery 18, through cable 17, cable 27, line 84, auxiliary contactor 83a, line 85, line 83, to contact 57, remains closed, and there is no interruption of drive to the truck. However, if either the selector lever 41 is disposed in a neutral position, or the key switch 43 opened, or the brake switch 54 opened, current flowing through the coil 49 is interrupted and the contactors 22 and 25, and auxiliary contactor 83a are opened, also. Thus both paths of current between the positive side of the battery 18 and the contact 57 are interrupted, and in order to again effect drive to the truck, the switch blade 64 must be returned into engagement with contacts 57 and 62.

From the foregoing description it will be seen that I have provided a control circuit for an industrial truck, by which first point of power and direction of drive of the traction motor is selected simultaneously through the manual actuation of a single control lever mounted on the steering column of the industrial truck. It will also be noted that the truck can only be started in first point of power. Also, merely shifting the lever 41, from forward to reverse drive, will not reverse the truck if the traction motor is in second, third, or fourth points of power.

In order to facilitate smooth shifts between different points of power, it will be apparent to those skilled in the art that various timing means may be incorporated either in connection with the contactor coils or the master switch.

While I have shown and described what I believe to be a preferred embodiment of my present invention, it will be understood that various rearrangements and modifications may be made therein without departing from the spirit and scope of my present invention.

I claim:

1. For use in a vehicle driven by an electric motor having a field coil and having an armature connected in series with a resistor and an electric power source, the combination of, first means including a first pair of electrically actuated contactors for selectively connecting the field coil in series in the armature circuit for driving the motor in one direction, second means including a second pair of electrically actuated contactors for selectively connecting the field coil in series in the armature circuit for driving the motor in the other direction, third means including a switch for successively shunting portions of said resistor, a secondary control circuit including a first coil associated with said first pair of contactors and a second coil associated with said second pair of contactors for effecting actuation of either said first or said second means, fourth means including a switch for selectively effecting energization of said first or second coils, said fourth means being independent of said third means, fifth means including an interlock for maintaining said first coil deenergized when said fourth means is disposed in a position normally energizing said first coil while any portion of said resistor is shunted, said fifth means being adapted to maintain said first coil energized as portions of said resistor are successively shunted while said fourth means remains in a position energizing said first coil, sixth means including an interlock for maintaining said second coil deenergized when said fourth means is disposed in a position normally energizing said second coil while any portion of said resistor is shunted, and said sixth means being adapted to maintain said second coil energized as portions of said resistor are successively shunted while said fourth means remain in a position energizing said second coil.

2. For use in a vehicle including a steering column and being driven by an electric motor having a field coil and having an armature connected in series with a resistor and an electric power source, the combination of, first means including a first pair of electrically actuated contactors for selectively connecting the field coil in series in the armature circuit for driving the motor in one direction, second means including a second pair of electrically actuated contactors for selectively connecting the field coil in series in the armature circuit for driving the motor in the other direction, a first actuator coil associated with said first pair of contactors for effecting actuation of the latter, a second coil associated with said second pair of contactors for effecting actuation thereof, a secondary control circuit for selectively effecting actuation of either said first or second coils, said secondary control circuit including a first manually operable switch on the steering column for opening and closing said secondary circuit, a second manually operable switch independent of said first manually operable switch for successively decreasing the total resistance of the electric motor circuit, said secondary control circuit further including a pair of interlocks, said secondary control circuit being electrically energized when said first switch is closed and said second switch is in a position wherein the total resistance of the motor circuit is at a maximum, said secondary control circuit remaining energized through one of said interlocks as the total resistance of the motor circuit is decreased from a maximum by said second switch while said first switch is maintained closed, and said secondary control circuit remaining deenergized when the total resistance of the motor circuit is less than a maximum and said first switch is initially closed.

References Cited in the file of this patent

UNITED STATES PATENTS

| Number | Name | Date |
|---|---|---|
| 1,460,562 | Yerger | July 3, 1923 |
| 1,802,765 | James | Apr. 28, 1931 |
| 1,940,927 | Wyman | Dec. 26, 1933 |
| 2,140,564 | Stoner | Dec. 20, 1938 |
| 2,456,908 | Bollaert | Dec. 21, 1948 |
| 2,539,552 | Remde | Jan. 30, 1951 |